(12) United States Patent
Vokey

(10) Patent No.: US 7,652,481 B2
(45) Date of Patent: Jan. 26, 2010

(54) METHOD AND APPARATUS TO DETECT AND LOCATE ROOF LEAKS

(75) Inventor: Davie E. Vokey, Sidney (CA)

(73) Assignee: Detec Systems LLC, Sidney, British Columbia (CA)

( * ) Notice: Subject to any disclaimer, the term of this patent is extended or adjusted under 35 U.S.C. 154(b) by 84 days.

(21) Appl. No.: 11/840,530

(22) Filed: Aug. 17, 2007

(65) Prior Publication Data

US 2009/0044595 A1 Feb. 19, 2009

(51) Int. Cl.
*G01V 3/08* (2006.01)
*G01R 31/08* (2006.01)
*G01N 27/00* (2006.01)

(52) U.S. Cl. .................. 324/523; 324/326; 324/512; 324/557

(58) Field of Classification Search .................. 324/512, 324/513, 519, 522, 523, 323, 325, 326, 557
See application file for complete search history.

(56) References Cited

U.S. PATENT DOCUMENTS

| | | | |
|---|---|---|---|
| 2,773,236 A * | 12/1956 | Martin et al. ............... 324/325 |
| 4,565,965 A | 1/1986 | Geesen |
| 5,049,247 A * | 9/1991 | Nyberg et al. ............ 205/792.5 |
| 5,081,422 A * | 1/1992 | Shih ........................... 324/693 |
| 6,331,778 B1 * | 12/2001 | Daily et al. .................. 324/557 |
| 6,617,855 B2 * | 9/2003 | Flatt et al. ................... 324/326 |
| 2004/0227521 A1 * | 11/2004 | Higashihama et al. ...... 324/522 |

* cited by examiner

*Primary Examiner*—Timothy J Dole
*Assistant Examiner*—Farhana Hoque
(74) *Attorney, Agent, or Firm*—Adrian D. Battison; Ade & Company Inc.

(57) ABSTRACT

A leak in a membrane on top of a horizontal roof deck is located by applying conductive wires on the membrane underneath the aggregate in a grid pattern. A measuring and switching circuit generates voltage having a positive attached to the roof deck and a negative attached to the wires. The circuit has a relay for each wire which can be switched between a current sensor system and the negative potential. The sensor system is arranged to sense at each of the wires in turn the current flowing from the roof deck through any leak in the membrane to the wire. A microprocessor operates the relays in turn to connect all the other wires to the negative as a shield while each wire is sensed. From the output of the grid the changes in current in the x and y directions are analyzed to locate the leak in the membrane.

18 Claims, 4 Drawing Sheets

METHOD AND APPARATUS TO DETECT AND LOCATE ROOF LEAKS

The present invention relates to a system for monitoring roof membranes for the presence and location of moisture penetration. It has particular application to monitoring low-slope and flat roofs of residential and commercial buildings for undesired water ingress.

BACKGROUND OF THE INVENTION

The failure to detect, find and correct minor roof deterioration in the earliest stages is considered the greatest cause of premature roof failure. This is particularly true of roofing materials applied on low-slope or flat roofs. Costly roofing problems are often the result of design deficiencies or faulty application of the roof system. Even when properly designed and applied, all roofing materials deteriorate from exposure to the weather at rates determined largely by the kind of material and the conditions of exposure.

Several methods have been used to try and locate roof leaks after they have occurred. Electric capacitance meters identify leaks uses a low-frequency that measures dielectric constant changes in the roofing material as a result of moisture below the membrane. Infrared cameras allow technicians to scan roof surfaces for temperature differentials that signify moist areas through changes in thermal conductivity or evaporation. Electric field vector mapping uses a wire loop around the perimeter of the roof surface to introduce an electric potential between the structural deck and a selected roof area which is sprayed with water. The electric field potential caused by a conductive path to any roof membrane damage is then located using a sensitive voltmeter and a pair of probes.

All of the above methods are usually employed to assist in locating roof leaks after costly water damage has occurred.

U.S. Pat. No. 4,565,965 issued Jan. 21, 1986 to Geesen discloses an arrangement for detecting leaks in flat roofs covered with a gravel layer in which electrical pulses are transmitted through the moisture in the leak to the roof edge and then the roof is scanned by a pulse sensor to find the leak by locating the maximum amplitude.

Moisture detection sensors can also be placed under the roof membrane to detect the presence of moisture intrusion. However several roof designs incorporate membranes that are directly adhered to the roof deck thereby limiting the placement and effectiveness of this type of moisture sensor application.

In regard to pitched roofs which are of a different construction and hence provide different challenges and requirements, U.S. Pat. No. 5,081,422 issued Jan. 14, 1992 to Shih discloses an arrangement for detecting leaks in pitched roofs using parallel pairs of conductors to detect a change in resistance value therebetween caused by the presence of moisture where the pairs are arranged in an array of the pairs spaced in the x and y directions. Testing of each pair sequentially will locate the leak in the x and y direction. The pairs are typically located on the supporting plywood beneath the tar paper and shingles but can be located on top of the tar paper and underneath the shingles or tar/sand mixture. In all cases the conductors are provided in pairs at the same location in the roof construction.

SUMMARY OF THE INVENTION

It is an object of the present invention to provide an apparatus and method for monitoring leaks in a flat or low slope roof construction of the type having an impermeable membrane applied over an underlying horizontal support.

According to a first aspect of the invention there is provided a method of detecting a leak in a roof where the roof comprises a generally horizontal roof support deck with a water impermeable membrane applied onto the upper surface of the support deck which may have a layer of aggregate or other roof build up material applied over the membrane, the method comprising:

applying conductive detectors on the top surface of the roof membrane in a grid pattern providing indications of distance in x and y direction across the membrane with each conductive detector being electrically insulated from each other;

providing a measuring and switching circuit for generating an electrical potential between two components of the circuit;

operating the circuit to connect one of the components of the circuit to the roof support deck on the underside of the membrane and to sense at each of the conductive detectors in turn the current flowing from the roof support deck to the conductive detectors;

and analyzing the changes in current in the x and y directions to locate the leak in the membrane.

Preferably the conductive detectors are bare wires applied to the upper surface of the membrane.

Preferably some of the conductive detectors include insulating sleeves thereon to allow a conductive detector to pass over the sleeve at right angles thereto.

Preferably, while the current at one of the conductive detectors is sensed, the others of the conductive detectors are connected to the other of the two components so as to be opposite in potential to the roof deck such that the other detection conductors form an electric shield between the selected conductive detector and any other membrane damage locations beyond the conductive detectors immediately adjacent to the selected conductor.

According to a second aspect of the invention there is provided an apparatus for use in detecting a leak in a roof comprising:

a plurality of conductive detectors arranged to be laid in a grid pattern on the roof providing indications of distance in x and y direction with each conductive detector being electrically insulated from each other;

a measuring and switching circuit for generating an electrical potential between two elements of the circuit for connection of one element to a component of the roof and the other element to the conductive detectors;

the circuit including for each of the conductive detectors a relay which can be switched between a first conductor connected to a sensor system and a second conductor connected to the other element of the circuit;

the sensor system being arranged to sense at each of the conductive detectors in turn the current flowing from the component of the roof to the conductive detectors;

and a microprocessor for operating each of the relays in turn such that, while the current at one of the conductive detectors is sensed, the others of the conductive detectors are connected to the other of the two elements of the circuit so as to be opposite in potential to the component of the roof.

The same sensors can also be used for a cathodic protection system in which a secondary cathodic protection supply and switch is provided such that in the off state, when no measurements are being made, a low voltage (usually about −0.85 to −1.1 vdc), cathodic protection supply is applied between all the sensor conductors and the building ground connected to the rood deck to inhibit corrosion and electrolysis.

The present invention thus describes a method whereby a grid of sensor conductors are laid on top of a directly adhered roof membrane to effect continuous scanning of the membrane for damage and moisture intrusion while avoiding false readings from metallic fasteners and other roof conductive penetrations that could cause false readings.

If needed, a permanent shield wire can be place around conductive roof penetrations to provide further isolation and avoid false readings.

The present invention thus proposes a system whereby conductive detectors can be laid on the top surface of a roof membrane in a grid like pattern whereby the conductor sensors are insulated from each other at the intersections. The individual conductors are electrically connected at a one end to a switching and measuring circuit whereby isolated fault current to ground measurements can be made. In the present invention a selected conductor is switched to the input of a current sensing amplifier and an electric potential is applied between the selected conductor and the roof deck ground. Any moisture leakage path through the roof membrane in the immediate region of the selected conductor will result in a fault current that is detected by the measuring circuit. All other detection conductors are connected to the circuit ground which forms an electric shield between the selected conductor and any other membrane damage locations beyond the conductors immediately adjacent to the selected conductor.

The fault current level for the gridded area as a function of the grid location can be mapped out by sequencing the selection and measurement process through all of the individual conductors.

Steel, concrete and even wood (if damp enough) are suitable conductors under the insulating water-proof membrane to provide the roof deck ground for this method to work.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION OF THE PREFERRED EMBODIMENT

Figure 1:
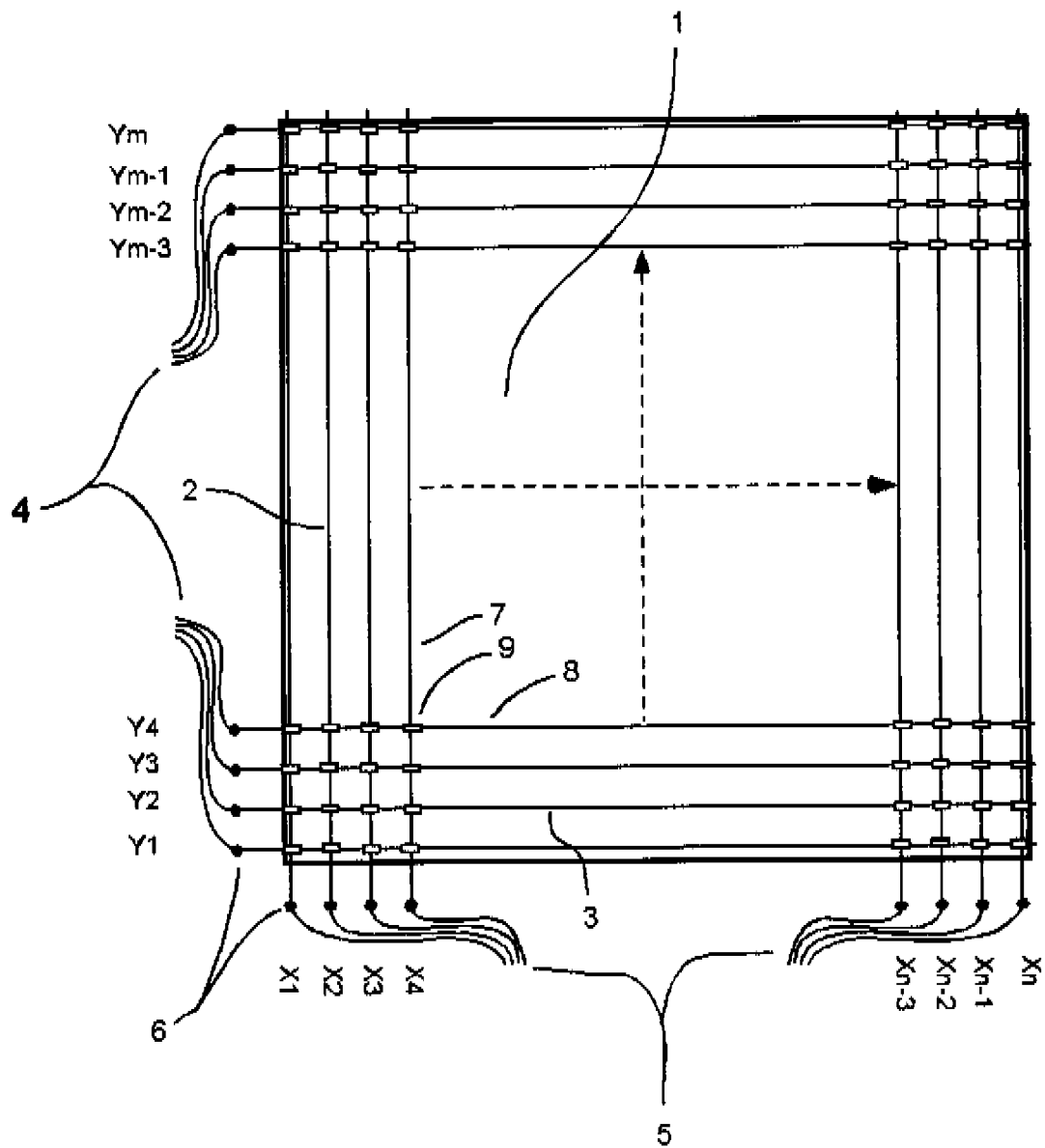
FIG. 1 is a schematic plan view of a roof membrane with the detection conductor grid, forming a part of the embodiment of the present invention, applied.
Figure 4:
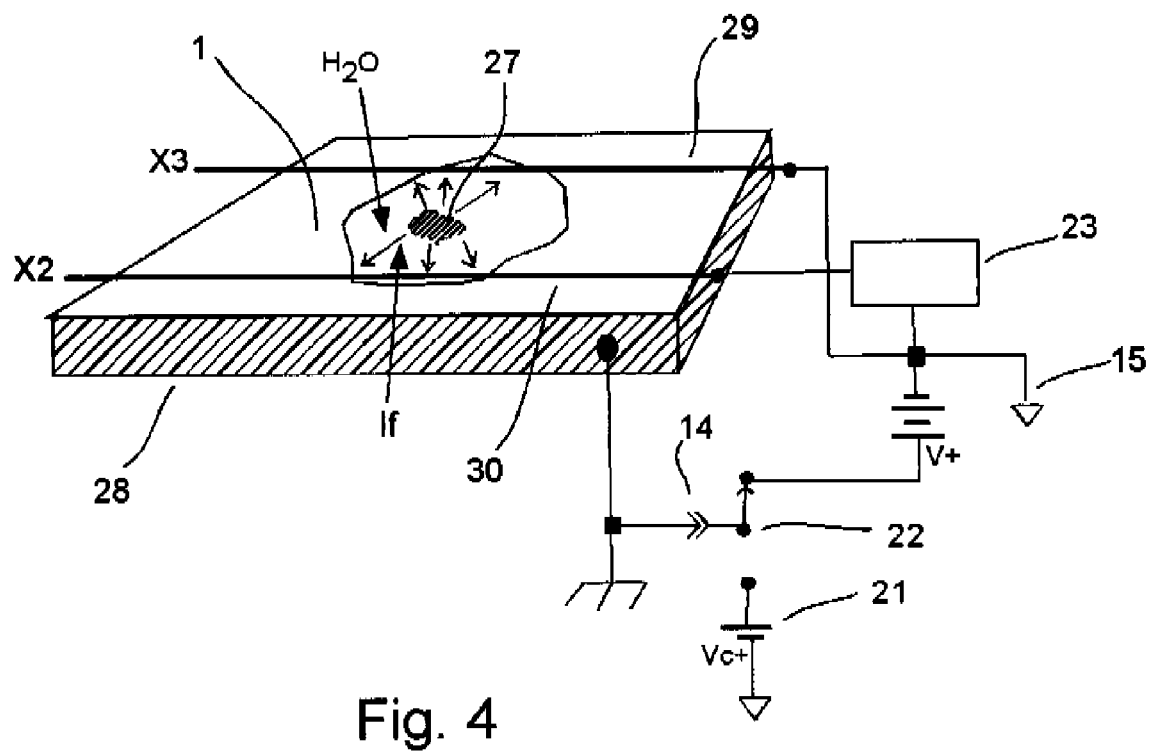
FIG. 4 is an isometric view of a typical installation of the detection conductor grid in a typical flat roof construction.

Referring now to the drawings, the overall arrangement of the subject roof membrane moisture detection system can best be seen with reference to FIGS. 1 and 4. A roof membrane 1 is illustrated which is applied as a direct covering layer over a roof deck 1A. The deck is typically of concrete but can be of any suitable material to provide the necessary structural strength and can be steel or wood. The membrane is an impervious material such as plastics and is sealed at any joints to provide a continuous water barrier over the roof deck. This barrier is intended to provide the leak prevention and any penetration therein caused by a puncture or faulty seal or by wear can allow the moisture to penetrate to the deck where it can cause damage or can continue into the structure to cause damage to internal structures.

The membrane may be covered by a layer of an aggregate material for heat insulation and protection. If used, the aggregate may be loose or may contain a binder such as asphalt. The arrangement described herein can be used with various roof constructions they can range from directly adhered membranes with no ballast (aggregate) to fully built up roofs with gardens.

Conductive moisture sensing cables 2 and 3 which are simple bare stranded stainless steel wires are laid across the roof in an array of parallel and generally orthogonal directions. The wires are usually sealed at the distal ends to avoid shorts. The wires can be bonded to the membrane. The array can be of any suitable layout to generate areas between the individual wires which can be monitored for the leak. The parallel arrangement of wires in the x and y direction is preferred but other arrangements are possible. The conductor-to-conductor spacing in the x and y directions is selected by the desired accuracy of locate. A one to two meter spacing is typical. A series of insulated connecting cables 4 and 5 are spliced at splices 6 to the originating ends of the sensing conductors. At crossing points each of the x direction sensing conductors 7 are insulated from the y direction wires 8 by a sleeve 9 applied onto one of the wires which is formed of a plastic or other suitable non-conducting material.

In place of separate wire sensor cables which are laid out into the grid pattern, flat conductors adhered to a dielectric substrate with a peel-and-stick backing provided by a pressure sensitive adhesive covered by a release sheet can also be used to form an adhered grid pattern on top of the membrane.

Figure 2:
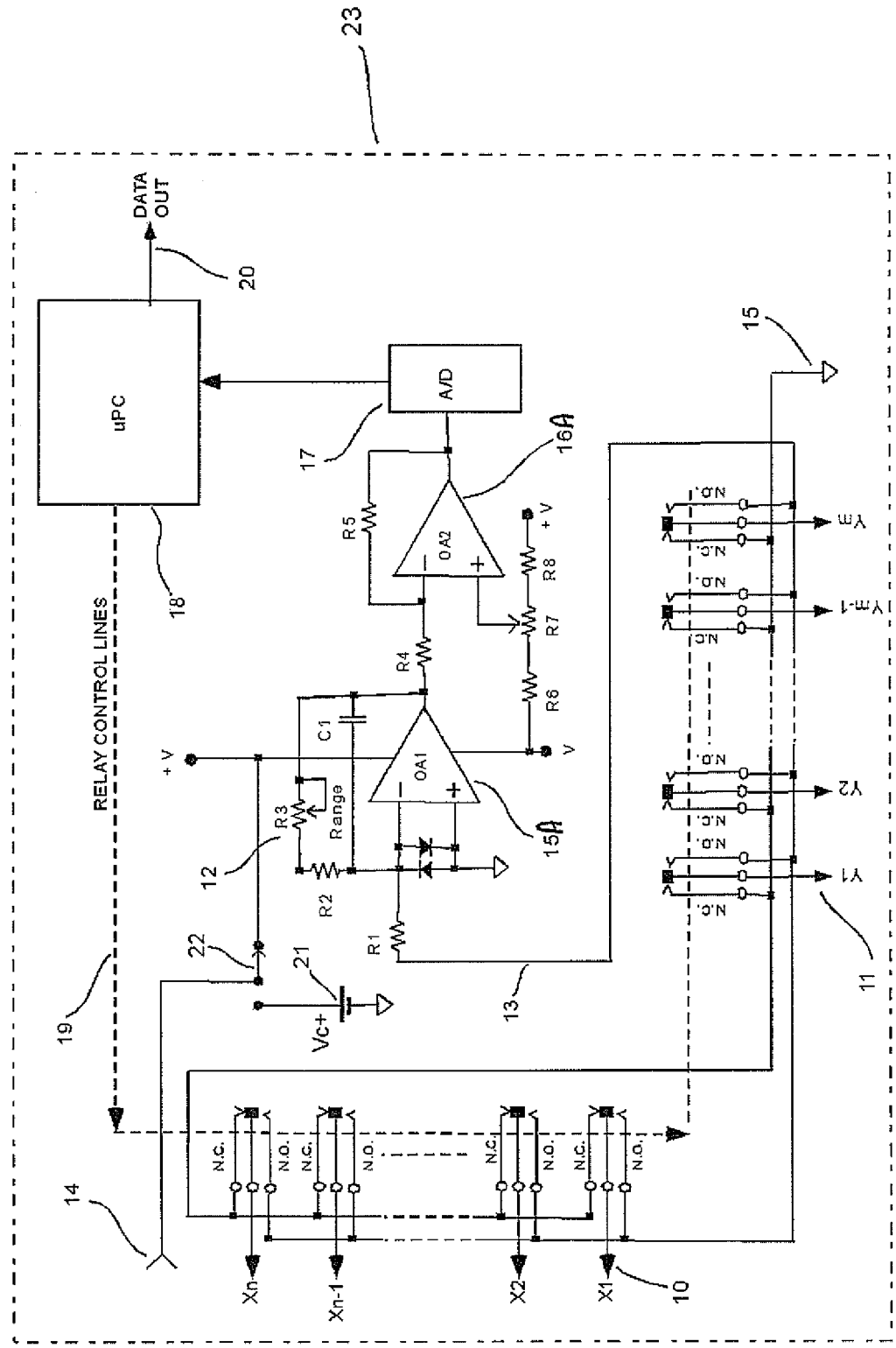
FIG. 2 is a circuit schematic showing the measuring and control circuit for monitoring the conductors of FIG. 1.

In FIGS. 2 and 4 is shown the measuring and switching circuit 23 which acts to apply the electric potential across the roof deck and the wires and acts to select one of the wires for sensing. This includes a sensing, amplifying and A/D conversion system including a pair of amplifiers 15A and 16A and an A/D converter 17. The components are controlled by microprocessor 18 which activates two series of relays 10 and 11.

The individual connecting cables 4 from zones Y1 to Ym are terminated on the inputs Y1 to Ym of Y axis relays 11. The individual connecting cables from zones X1 to Xn (5) are terminated on the inputs X1 to Xn of the X axis relays 10. In the normally closed position of the relays, the sensing cables are all connected to circuit ground 15.

The roof deck 28 is connected to the positive side of the circuit power supply 18 though a connector 14.

Once a selected relay 10 or 11 is energized by the microprocessor 18, the selected line is connected on a line 13 through resistor R1 to the negative summing input of OA1 of the amplifier 15A. D1 and D2 are input protection diodes. The gain of the amplifier 15A is set by resistors R2 and R3 to match the desired fault current range which constitutes a threshold of the current flowing between the selected wire and the roof deck.

In order to automatically adjust the threshold, the resistor 12 R3 may be a variable resistance controlled by the micro processor 18.

Capacitor C1 provides noise filtering and smoothes the output response of amplifier 15. Resistor R4 couples the output of amplifier 15A to the input of the negative summing input of amplifier 16A. Resistors R4 and R5 are selected to provide suitable range scaling for the analog-to digital converter 17. Resistors R6, R7 and R8 form an voltage divider network adjustable to provide offset adjust for amplifier 16A.

The amplified and filtered current measurement signal from the selected relay is applied from the output of amplifier 16A to the input of the A/D converter 17. The digital level output from the A/D converter is then forwarded to the micro processor controller 18 which processes and forwards the result 20 to a monitoring computer. The micro processor controller 18 then increments the energizing signal to the next sequential relay via the relay control lines 19. The sequence is repeated until the $n^{th}$ and $m^{th}$ X and Y relays have been reached respectively.

Detection of a leak in the roof, defined by the generally horizontal roof support deck 28 with a water impermeable membrane 1 applied onto the upper surface of the support deck, is effected by applying conductive detectors 2 and 3 on the top surface of the roof membrane in the grid pattern providing indications of distance in x and y direction across the membrane. The measuring and switching circuit 23 causes the application of the electrical potential between the roof support deck on the under side of the membrane and the wires on the top and acts to sense at each of the conductive detectors in turn the current flowing from the roof support deck to the conductive detectors. The changes in current in the x and y directions are analyzed to locate the leak in the membrane.

While the current at one of the conductive detectors is sensed, the others of the conductive detectors are connected to circuit ground so as to be opposite in potential to the roof deck such that the other detection conductors form a shielded zone around the selected conductor defining an electric shield between the selected conductive detector and any other membrane damage locations beyond the conductive detectors immediately adjacent to the selected conductor. As each conductor is selected the shielded zone around that selected conductor in effect is moved across the roof since different ones of the adjacent conductors are selected as the shielding wires to define the zone as the selection of the sensing conductor changes.

Figure 3:
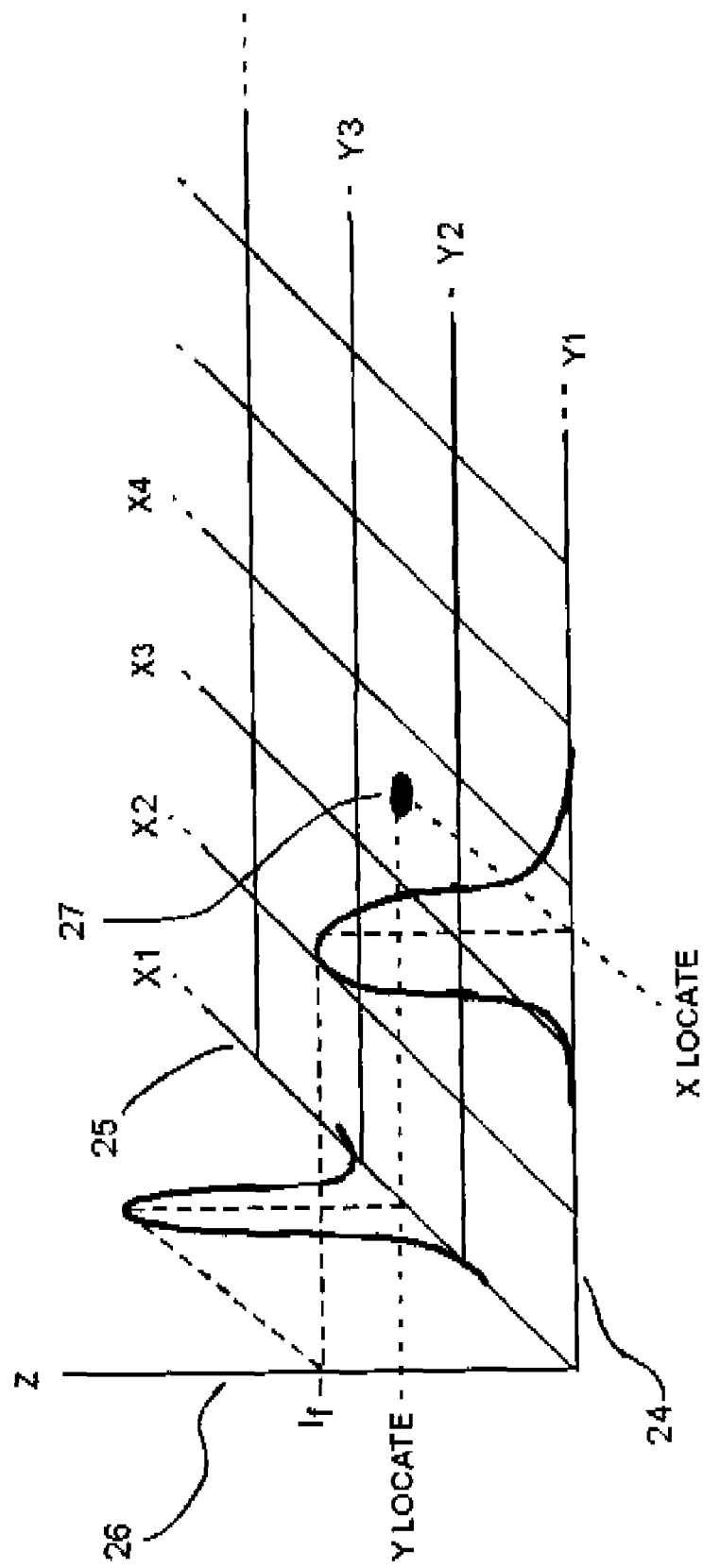
FIG. 3 is an illustration of a plotted output of a roof membrane scan using the outputs from the circuit of FIG. 2.

As shown in FIG. 3, the stored output of the measurement process can then be plotted in on a three dimensional graph. The leakage current level is represented as $I_r$ on the Z axis 26, the roof membrane detection cables are plotted on the X axis 24 and Y axis 25 respectively. A leakage current example is plotted on the X and Y axis as illustrated. The current maximums allow a vectoring to the membrane damage location indicated at 27.

When no measurements are being made, a low voltage supply 21 can be switched 22 into the circuit thereby connecting the positive terminal of the supply to the roof deck ground via the ground connector 14 with the negative terminal connected to circuit ground. This will impress a cathodic protection current on the sensing conductors at any current leakage points to counter act any galvanic corrosive mechanisms.

Figure 5:
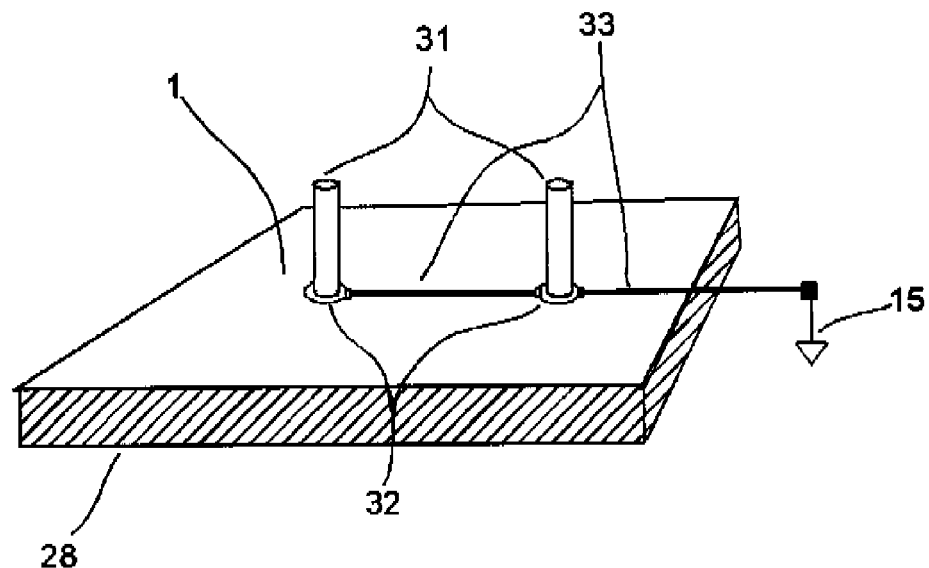
FIG. 5 is an isometric view of metallic roof penetrations with shield rings installed.

As shown in FIG. 5, shield rings 32 can be dressed around roof penetrations 31 and connected to the shield circuit ground via insulated connecting cables 33. This will further isolate conductive penetrations and reduce the risk of false readings.

The invention claimed is:

1. A method of locating a defect in a roof, where the roof comprises a generally horizontal roof support deck with a water impermeable membrane applied onto the upper surface of the support deck, the method comprising:

applying conductive detectors on the top surface of the roof membrane in a grid pattern providing indications of distance in x and y direction across the membrane with each conductive detector being electrically insulated from each other;

providing a measuring and switching circuit for generating an electrical potential between two components of the circuit;

operating the circuit to connect one of the components of the circuit to the roof support deck on the under side of the membrane and the other of the components to at least one of the conductive detectors on the top surface of the roof membrane to cause a potential difference between the roof support deck and said at least one of the conductive detectors;

and operating the circuit to sense at each of the conductive detectors in turn the current flowing therein in response to the potential difference;

and analyzing the sensed currents in the x and y directions to locate the defect in the membrane.

2. The method according to claim 1 wherein the conductive detectors are bare wires applied to the upper surface of the membrane.

3. The method according to claim 1 wherein the conductive detectors are covered by an aggregate or covering material over the membrane.

4. The method according to claim 1 wherein some of the conductive detectors include insulating sleeves thereon to allow a conductive detector to pass over the sleeve at right angles thereto.

5. The method according to claim 1 wherein a shield wire is placed around conductive roof penetrations and connected to the other of the two circuit components.

6. The method according to claim 1 wherein the conductive detectors are connected by a secondary cathodic protection supply and switch such that, when no measurements are being made, a low voltage cathodic protection supply is applied between the conductive detectors and the building ground connected to the roof deck to inhibit corrosion and electrolysis.

7. A method of locating a defect in a water impermeable membrane of a roof, where the roof comprises a generally horizontal roof support deck with the water impermeable membrane applied onto the upper surface of the support deck, the method comprising:

applying conductive detectors on the top surface of the membrane in a grid pattern in x and y directions across the membrane with each conductive detector being electrically insulated from each other;

selecting each in turn of the conductive detectors;

when each is selected, generating a potential difference between the selected conductive detector and the roof support deck such that a current will flow between the roof deck and the selected conductive detector through moisture in any defect located within a shielding zone;

when each is selected, generating a potential difference between at least some of the others of the conductive detectors, other than the selected conductive detector, and the roof support deck such that currents generated through the membrane remote from the defect are drawn to the others of the conductive detectors so as to create the shielding zone around the selected conductive detector;

sensing the current between the roof deck and the selected conductive detector so as to detect current caused by any defect located within the shielding zone;

and when all conductive detectors have been selected and the currents sensed, analyzing the sensed currents in the x and y directions to locate the defect in the membrane.

8. The method according to claim 7 wherein the conductive detectors are bare wires applied to the upper surface of the membrane.

9. The method according to claim 7 wherein the conductive detectors are covered by an aggregate or covering material over the membrane.

10. The method according to claim 7 wherein some of the conductive detectors include insulating sleeves thereon to allow another one of the conductive detectors to pass over the sleeve at right angles thereto.

11. The method according to claim 7 wherein a conductive shield wire is placed around a conductive roof penetration and wherein a potential difference is generated between the conductive shield wire and the roof support deck such that currents generated by the conductive roof penetration are drawn to the conductive shield wire.

12. The method according to claim 7 wherein the conductive detectors are connected by a secondary cathodic protection supply and switch such that, when no current sensing is being carried out, a low voltage cathodic protection supply is applied between the conductive detectors and the roof deck to inhibit corrosion and electrolysis.

13. The method according to claim 7 wherein the potential applied across the conductive detectors and the roof deck when selected and across the conductive detectors and the roof deck when not selected is substantially the same.

14. A method of locating a defect in a water impermeable membrane of a roof, where the roof comprises a generally horizontal roof support deck with the water impermeable membrane applied onto the upper surface of the support deck, the method comprising:

defining a shielding zone on the top surface of the membrane by providing at least one shielding conductor on the top surface and generating an electrical potential between the at least one shielding conductor and the roof deck such that currents generated through the membrane outside the zone are drawn to the at least one shielding conductor;

locating a conductive detector on the top surface of the roof membrane within the shielding zone;

generating an electrical potential between the conductive detector and the roof deck such that current will flow between the roof deck and the conductive detector through moisture in any defect located within the zone;

sensing the current between the roof deck and the conductive detector so as to detect any defect located within the zone;

and arranging the at least one shielding conductor and the conductive detector so as to move the zone to different locations on the roof.

15. The method according to claim 14 wherein the shielding conductors and the conductive detector are bare wires applied to the upper surface of the membrane.

16. The method according to claim 14 wherein the shielding conductors and the conductive detector are covered by an aggregate or covering material over the membrane.

17. The method according to claim 14 wherein the shielding conductors and the conductive detector include insulating sleeves thereon to allow another one of the conductive detectors to pass over the sleeve at right angles thereto.

18. The method according to claim 14 wherein the potential applied across the conductive detector and the roof deck when selected and across the shielding conductors and the roof deck when not selected is substantially the same.

* * * * *